May 31, 1966 R. A. CHEVALAZ 3,253,407
ROCKET MOTOR AND FLOW CONTROL INSERT THEREFOR
Filed Oct. 19, 1962
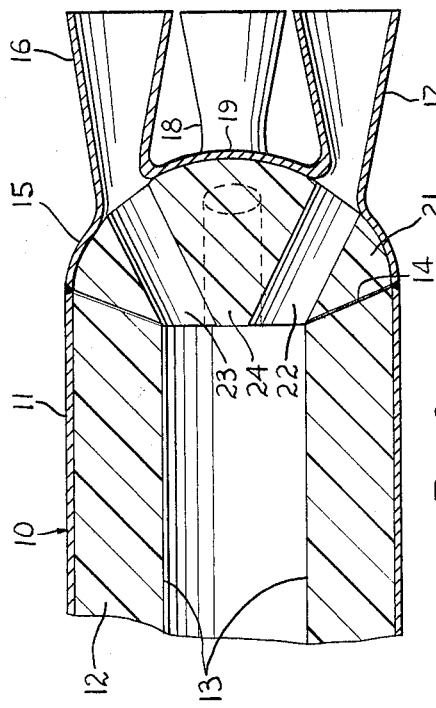
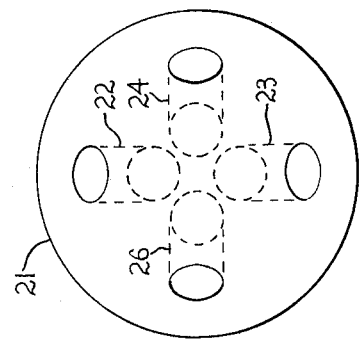
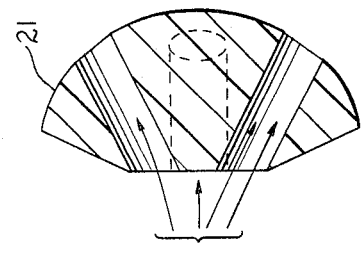
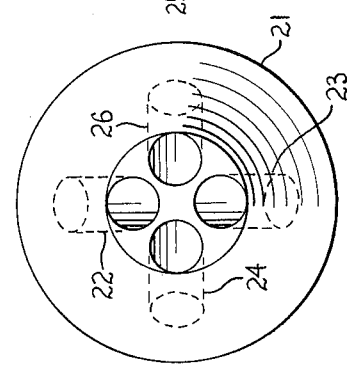
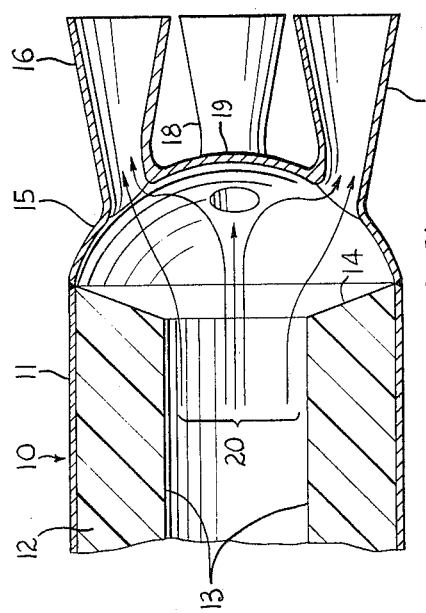
INVENTOR.
ROGER A. CHEVALAZ
BY Thomas W. Brennan
AGENT

United States Patent Office 3,253,407
Patented May 31, 1966

3,253,407
ROCKET MOTOR AND FLOW CONTROL
INSERT THEREFOR
Roger A. Chevalaz, Rockaway, N.J., assignor to Thiokol Chemical Corporation, Bristol, Pa., a corporation of Delaware
Filed Oct. 19, 1962, Ser. No. 231,732
3 Claims. (Cl. 60—35.6)

This invention relates to multiple or multi-nozzle rocket motors, and more particularly to center burning grain solid propellant motors having provision therein for guiding gases produced by the burning or combustion of said propellant to the nozzles. Prior solid propellant rocket motors of the multi-nozzle type are subject to inefficiencies induced by the tortuous flow paths through which the gases must pass in flowing from the end of the center burning grain to each of the individual nozzles. This disadvantage is particularly applicable to metal bearing solid propellants because severe deposition of and erosion by the metal additives occurs, especially early in the firing or burning cycle of the motor. Excessive material degradation and loss of rocket motor performance (efficiency) results thereby.

Most prior art devices used to overcome these disadvantages are in the form of flow guidance surfaces and the like. However, such devices almost always represent an increase in the motor dead weight because the high temperature evolved due to the burning propellant necessarily results in the use therefor of a heavy weight substance in their manufacture. In addition, the long duration firing time required in the use of modern missiles, especially those of the large, booster type for which the multiple-nozzle configurations are most often used, require materials able to withstand the resulting high temperatures.

Accordingly, it is an object of the present invention to provide a device wherein the cavity formed by the end of the grain and the aft header of the multiple nozzle block attached to the casing surrounding the solid propellant grain, is filled with solid propellant. It is another object of the invention to provide a device suitable for use in guiding the gases produced by the burning of solid propellant containing metallic additives for increased performance, which permits said gases to flow through a relatively smooth path in gaining entrance to the nozzle block and/or the individual nozzles therein. It is a further object of the invention to provide a device as hereinbefore referred to wherein these flow paths are smooth bore flow tubes, one to each nozzle. It is a still further object to provide flow tubes as above referred to which are shaped so as to provide an optimum flow path to each nozzle entrance and in which the device containing said flow tube is formed of material consumable in a manner similar to the solid propellant contained in the main or center burning grain.

Other objects and attendant advantages of this invention will be readily appreciated as it becomes better understood by reference to the following detailed description when considered in connection with the accompanying drawing wherein:

FIGURE 1 is a fragmentary side elevation of the rear or aft end of a prior art rocket motor showing a typical multiple nozzle configuration;

FIGURE 2 is a similar fragmentary side elevation of the aft end of a rocket motor encompassing the invention;

FIGURE 3 is a side elevation of the invention removed from the casing; and,

FIGURES 4 and 5 are front and rear views of the invention of FIGURE 3.

Referring in detail to the drawing, and in particular to FIGURE 1 thereof, rocket motor 10 is provided with a substantially cylindrical casing 11, surrounding a solid propellant grain 12 having center burning surfaces 13. End surface 14 may be either a burning or inhibited surface, depending upon the composition of grain 12 and end use of motor 10. Also shown is a nozzle block 15 comprising four, individual nozzles of which three, 16, 17 and 18, are visible. Aft or end plate 19 which also serves as a flow divider is also picture as part of nozzle block 15. Finally, flow, or stream lines 20 which indicate the necessarily tortuous path through which the gases must flow, as is typical of most prior art motors, are shown. Flow lines 20 indicate that the gas originating at solid propellant motor surfaces 13 (and 14 when so designed), in order to produce thrust, must be exhausted through nozzles 16, 17 (and 18) and go through a relatively circuitous path. It is possible to alleviate this unwanted condition by inserting in the space between surface 14 and aft head 19 a flow splitter insert (not shown in FIG. 1) which will provide smoother passage for the gases. However such provision will also result in increased motor dead weight and accordingly will diminish overall motor performance through less favorable propellant to motor weight ratio.

Instead, as set forth in FIGURE 2, flow splitter 21 of this invention is formed within the cavity defined by the aft head 19, burning surface 14 and the nozzle block 15. Flow splitter 21 is made from material the same as or similar to solid propellant grain 12 and is similarly combustible therewith. Flow splitter 21 is further fitted with suitable flow passages or "tubes," 22, 23, and 24 such that an optimum gas flow path for the high temperature gases produced by the combustion of propellant grain 12 is provided to each of the nozzles in nozzle block 15. Similarly to FIGURE 1, a four nozzle arrangement is shown.

FIGURE 3 presents a view of flow splitter or insert 21, showing flow or stream lines 25, representing the flow paths of the gases originating from the burning surfaces 13 and 14, the relatively smoother gas flow achieved through the flow tubes or passages 22, 23, and 24 Thus, by means of this invention gas flow between the center burning grain 12 and the downstream nozzles in the nozzle block 15 is much improved.

FIGURES 4 and 5 by picturing the rear or exit end, and the front or entrance end, of flow splitter 21, show clearly the manner in which the gases leaving the center of grain 12 are relatively uninhibited in their passage to the nozzle block 15. Through this means overall motor operation is much improved and more efficient.

In operation of the invention described above, the flow splitter 21 is preferably preformed and inserted prior to assembly of nozzle block 15 to casing 11, and is fashioned of propellant similar to or the same as grain 12. However, in certain other applications it may be desirable to modify the burning characteristics of the solid propellant of which flow splitter 21 is made to achieve more favorable or special flow conditions. It is also readily apparent that flow splitter 21, preferably shown as an insert, may also be cast in place.

By use of insert 21 and flow tubes or passages 22 therein, much non-usable dead motor weight is eliminated and overall efficiency of the motor thereby improved, since high temperature gas flow conditions are much improved. The surfaces of the tubes 22, which are themselves burning surfaces, add their gaseous products of combustion to the total motor exhaust flow. Any deposition of metal additives incorporated into the main solid propellant grain 12 is recoverable, as this material burns later in the firing of the motor. In all events this deposition effect is considerably reduced, if not totally eliminated, as the phenomenon of secondary circulatory flow which causes further unwanted metal additive deposition in the nozzle throat region wherein such build-up effectively reduces nozzle diameter and therefore nozzle performance, is itself reduced. This is especially important where the nozzles are swivelled for thrust vectoring which, at present, is the most-often used method of controlling large solid propellant rocket motors in and/or about their flight path.

Obviously since many modifications and variations of this invention are possible in the light of the above teachings, it is therefore to be understood that within the scope of the appended claims the invention may be practiced otherwise than as specifically described.

What is claimed is:

1. In a solid propellant multi-nozzle rocket motor having a casing containing a solid propellant grain with a center burning surface therein and a nozzle block including a plurality of nozzles mounted on an end plate integral with said casing and extending rearwardly of the aft end surface of said plate, the improvement comprising a solid propellant insert filling the cavity between said nozzles and the aft end surface of said grain, said solid propellant insert being formed with a separate flow passage therethrough for each of said nozzles for passage of the gases originating from the combustion of said grain, said flow passages oriented in said insert to connect each of said nozzles in said nozzle block with the center burning surface of said grain in said motor.

2. A rocket motor comprising a substantially cylindrical casing, a first solid propellant grain having a burning surface therein positioned substantially centrally of said casing, a nozzle block attached to said casing, the inner surface of said nozzle block and the aft end surface of said first solid propellant grain defining a cavity at the aft end of said casing, a second solid propellant grain filling said cavity, said second solid propellant grain being formed with separate fluid passages therein communicably connecting each of the nozzles of said nozzle block with said burning surface of said first solid propellant grain in said motor.

3. A rocket motor comprising a substantially cylindrical casing, a perforated solid propellant grain disposed in said casing, an end plate fixedly attached to the aft end of said casing, the inner surface of said end plate being spaced from the aft end surface of said grain to form a cavity therebetween, a plurality of nozzles fixedly mounted on said end plate and extending rearwardly therefrom, and a solid propellant insert having peripheral surfaces that abut the inner surface of said end plate and the aft end surface of said grain respectively, said insert being formed with a plurality of fluid passages therein each communicably connecting a respective one of said nozzles with the perforation in said grain.

References Cited by the Examiner

UNITED STATES PATENTS

| 2,924,174 | 2/1960 | McLean | 60—35.6 |
| 3,052,092 | 9/1962 | Kirkbride | 60—35.6 |
| 3,096,616 | 7/1963 | Edman | 102—49 |
| 3,099,959 | 8/1963 | Bowersett | 60—35.6 |
| 3,122,884 | 3/1964 | Grover et al. | 60—35.6 |

FOREIGN PATENTS 659,758 10/1951 Great Britain.

MARK NEWMAN, *Primary Examiner.*

SAMUEL FEINBERG, SAMUEL LEVINE, *Examiners.*

C. R. COYLE, A. L. SMITH, *Assistant Examiners.*